July 24, 1973 T. F. CARMICHAEL ET AL Re. 27,704

IGNITION SYSTEM

Original Filed Oct. 23, 1965

United States Patent Office

Re. 27,704
Reissued July 24, 1973

27,704
IGNITION SYSTEM

Thomas F. Carmichael, Drayton Plains, and Richard J. Maier, Pontiac, Mich., assignors to Syncro Corporation, Oxford, Mich.

Original No. 3,358,665, dated Dec. 19, 1967, Ser. No. 503,986, Oct. 23, 1965. Application for reissue Nov. 23, 1970, Ser. No. 76,834
Int. Cl. F02p 3/06
U.S. Cl. 123—148 E 47 Claims

Matter enclosed in heavy brackets [ ] appears in the original patent but forms no part of this reissue specification; matter printed in italics indicates the additions made by reissue.

ABSTRACT OF THE DISCLOSURE

A solid state ignition system in combination with an electrical generating device for generating electrical power for an engine.

The present invention relates to solid state ignition systems and more particularly to solid state ignition systems in combination with an alternator structure.

In the present invention a novel capacitor discharge type ignition system is provided; therefore, it is an object of the present invention to provide a novel ignition system of the capacitor discharge type.

In the present invention a novel solid state ignition system is provided in conjunction with an alternator construction, thereby resulting in savings, since some of the structural components between the alternator and the ignition system can be made common.

Therefore, it is an object of the present invention to provide a novel solid state ignition system in which portions of the ignition system are in combination with an alternator.

In one form of the present invention an ignition system is provided which can be utilized with a distributor; it is another object of the present invention to provide a novel solid state ignition system for use with a distributor.

It is a general object of the present invention to provide a novel ignition system.

Other objects, features, and advantages of the present invention will become apparent from the subsequent description and the appended claims, taken in conjunction with the accompanying drawings, in which:

Figure 1:
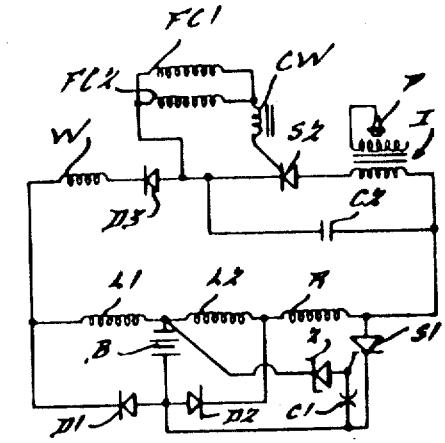
FIGURE 1 is a schematic diagram of a preferred form of an ignition system of the present invention.

Looking now to FIGURE 1, a schematic diagram is shown for a regulated alternator and spark ignition system. A battery B is shown to be charged by means of current generated by a pair of load windings L1 and L2, each of which has one end connected to the positive side of the battery B with the other side of load winding L1 being connected to the ground side of the battery B via a diode D1 and the other side of the load winding L2 being connected to the ground side of battery B via a diode D2. The diodes D1 and D2 provide for rectification of the potential generated by the load windings L1 and L2. Regulation is provided by a regulating winding R which has one end connected between the juncture of the load winding L2 and the diode D2 and its other end connected to the anode of an SCR S1 which has its cathode connected to the ground side of the battery B. The gate of the SCR S1 is connected to the positive side of the battery B via a Zener diode Z. The load windings 21 and 22 and regulating winding R are wound upon the same poles of a stator. A capacitor C1 is connected from the gate of the SCR S1 to the ground terminal of the battery B. The alternator and regulator as shown and described are of a construction similar to and function in a manner similar to that of the alternator and regulator shown and described in the copending patent application of Thomas F. Carmichael et al., Ser. No. 199,811, filed June 24, 1962. Thus the potential across battery B is sensed by means of the Zener diode Z such that when it reaches a preselected level indicating battery B to be charged the Zener diode will break down, permitting a gate to cathode current flow to the SCR S1 permitting it to conduct, whereby a substantially low impedance or short circuit path is provided across battery B through the regulating winding R thereby reducing the resulting potential applied by the load windings L1 and L2 across the battery B.

In addition to the load windings L1 and L2 and the regulating winding R, a charge winding W is connected to the juncture between load winding L1 and diode D1 and to a diode D3. The charge winding W is also wound upon the poles of the stator. The diode D3 in turn is connected to a charging capacitor C2 in the ignition portion of the circuit shown in FIGURE 1. The opposite side of capacitor C2 is connected to the juncture between the regulating winding R and the anode of the SCR S1. Thus the winding W will provide a pulsating DC to the diode D3 whereby the capacitor C2 can be charged. Connected in parallel with the capacitor C2 are the principal electrodes of an SCR S2, which are also connected in series with the primary winding of an ignition coil I which has its secondary winding connected to a spark plug P. The gate of the SCR S2 is connected through a choke winding CW to one end of a pair of parallelly connected firing coils FC1 and FC2 which are also wound upon poles of the stator. The opposite end of the coils FC1 and FC2 is connected ot the cathode of the SCR S2.

In operation, the winding W will transmit pulsating current through the diode D3 whereby the capacitor C2 will be charged; this charge will then flow through the primary winding of the ignition coil I to fire the spark plug P when the SCR S2 has been rendered conductive by the gate-cathode current provided by the firing coils FC1 and FC2. Coils FC1 and FC2 in the preferred form are wound upon some of the poles upon which the load coils L1, L2, regulating winding R and the charge winding W are wound and are connected whereby the resultant potential thereacross is normally zero.

Figure 5:
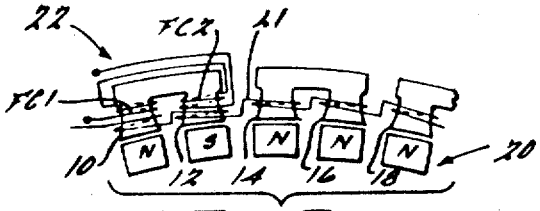
FIGURE 5 is a pictorial representation of one form of an alternator structure for use in the present invention.

It is important that the time of firing of the SCR S2 be set such that the plug P be fired at the proper time relative to the position of the piston of the engine with which the plug P is associated. Timing is provided by means of the construction of the alternator portion which is shown in FIGURE 5. In FIGURE 5 a plurality of north and south poles are indicated by the letters N and S, respectively. These are of the permanent magnet type and are mounted upon a rotor generally indicated by the numeral 20. A stator 22 is provided with a plurality of pole structures indicated by the numerals 10, 12, 14, 16 and 18. The load coils L1, L2, regulating winding R, and the charge winding W normally would be wound and distributed in the conventional manner substantially uniformly about the poles 10–18 as well as the remaining poles of the stator 22. However, the firing coils FC1 and FC2 will be wound upon selected, adjacent poles 10 and 12 only. These coils FC1 and FC2 will be wound in opposition such that, in the position as shown in FIGURE 5, the firing coil FC1 is located in line with the north pole and the coil FC2 located in line with the south pole and hence the resultant potential across the two will be zero, and hence at this position no current will be flowing through the gate circuit of the SCR S2 and hence the plug P cannot be fired since the capacitor C2 will not discharge. However, as shown in FIGURE 5, the normal sequence of pole arrangement has been altered whereby one of the south poles has been replaced by a north pole; when the rotor 20 has been rotated such that the firing coils FC1 and FC2 are both in line with poles of similar polarity, i.e., such as two north poles, then the result will be an additive potential rather than a bucking potential with the resultant potential being capable of creating current flow through the gate circuit of the SCR S2 resulting in its firing, whereby the stored energy in the capacitor C2 will flow through the primary of the ignition coil I whereby the plug P is fired.

For a single cylinder engine only one set of firing coils FC1 and FC2 would be provided. For multi-cylinder engines additional sets of coils such FC1 and FC2 would be used as needed along with, of course, an associated SCR S2, a charging capacitor C2, and an ignition coil 1. Where an even number of cylinders is provided, then a single set of coils FC1 and FC2 along with its associated circuitry be utilized for a pair of cylinders since one spark plug P could be fired when one piston is at top dead center on a compression stroke and another plug could be simultaneously fired when its piston is at the top of the exhaust stroke.

It is desirable that the ignition system be capable of provdiing spark advance, etc. By proper selection of the choke coil CW it has been found that proper spark advance over a selected speed range can be automatically provided.

Figure 2:
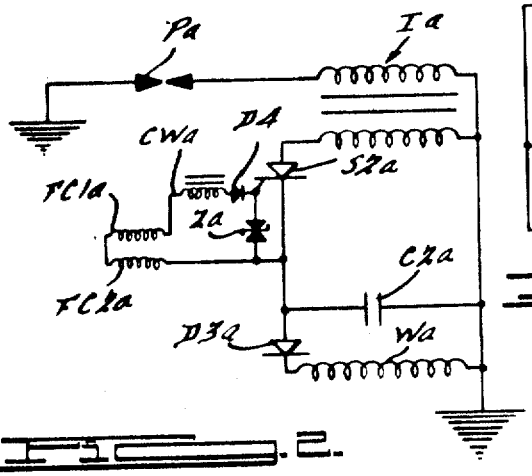
FIGURES 2 and 3 are circuit diagrams of modified forms of the ignition system of the present invention.

A modified form of the invention is shown in FIGURE 2 in which components which serve functions similar to like components shown in FIGURE 1 are given the same designation with the addition of the postscript letter "a." Thus, in the FIGURE 2 the charge capacitor C2a is charged by means of a charging winding Wa which, through a diode D3a, provides a unidirectional charging current. An SCR S2a has its principal electrodes connected to the primary of an ignition coil Ia with the capacitor C2a being connected generally in a series circuit to the principal electrodes of the SCR S2a and the primary of the ignition coil Ia. The firing coils FC1a and FC2a are connected together in series in a circuit including a choke coil CWa, and a diode D4. Diode D4 is connected to the gate of the SCR S2a and thence to the cathode of the SCR S2a through a pair of back-to-back Zener diodes Za, which are connected from the junction of the gate of SCR S2a with the diode D4 to the cathode of the SCR S2a. The combination of the choke winding CWa and the clipping action of the Zener diode Za provide for a wave form shape such that at different speeds of the engine and the different speeds of the alternator, the wave shape of the voltage generated by the firing coils FC1a and FC2a will provide automatic spark advance and retardation over the speed range of the engine. As previously noted, upon firing of the SCR S2a, the capacitor C2a will discharge through the principal electrodes of the SCR S2a to provide for a spark across the plug Pa. Triggering can be provided by mounting the coils FC1a and FC2a in a manner similar to that of coils FC1 and FC2 described in the description of FIGURE 1.

In the circuit diagram of FIGURE 2, the portions of the alternator and regulator are not shown since they are not electrically connected to the ignition system shown. Thus the charge winding Wa is not connected electrically to the load windings of the alternator; note, however, that the charging winding Wa, in addition to its charging function, could be utilized as the regulating winding. Thus the regulating winding (such as winding R of FIGURE 1) could be eliminated and the charging winding Wa could serve both functions of performing regulation as well as generating a potential for the charging of capacitor C2a.

Figure 3:
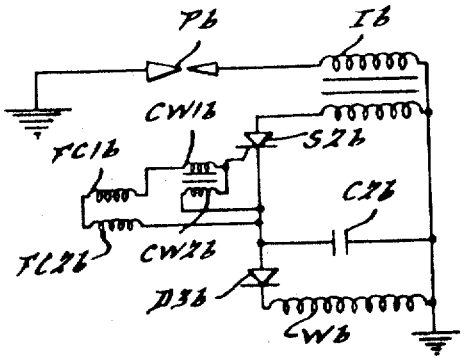

A different embodiment is shown in FIGURE 3, which is similar to that shown in FIGURE 2. In the description of the embodiment in FIGURE 3, components which serve similar functions to like components shown in FIGURES 1 and 2 will be given similar designations with the addition of the postscript letter "b." In the embodiment shown in FIGURE 3, the principal difference from that of FIGURE 2 is in the gating circuit for the SCR S2a in which the firing coils FC1b and FC2b are again serially connected with the firing coil FC1b connected to the gate of the SCR S2b through a first choke coil CW1b; the gate of the SCR S2b is connected to its cathode via a second choke coil CW2b. The chokes CW1b and CW2b are inductively coupled through a common core. The rest of the components Pb, Ib, C2b, D3b and Wb are similar to components Pa, Ia, C2a, D3a and Wa of FIGURE 2 and perform similar functions. The use of the choke coils CW1b and CW2b provide for automatic spark advance over the speed range of the engine.

Figure 4:
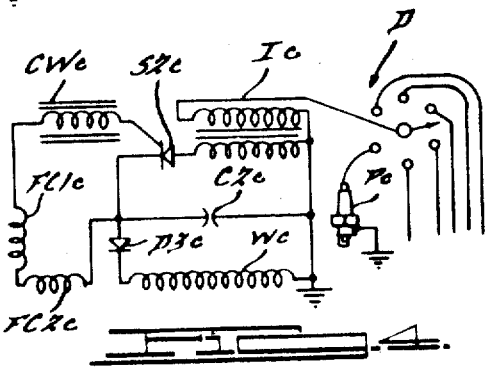
FIGURE 4 is a modified form of the ignition system of the present invention utilizing a distributor.

In the description of the embodiments shown in FIGURES 1, 2 and 3, no distributor is provided; in FIGURE 4 a circuit is shown utilizing a distributor. In FIGURE 4 only one ignition coil Ic is utilized.

In the descripiton of the embodiment shown in FIGURE 4, components similar to those shown in the embodiments of FIGURES 1, 2, 3 will be given similar designations with the postscript "c." Thus, in the embodiment shown in FIGURE 4, the charging coil Wc will charge a capacitor C2c via a diode D3c; and SCR S2c has its principal electrodes serially connected to the primary of an ignition coil Ic with the principal electrodes and primary being connected in parallel across the capacitor C2c. The gate of the SCR S2c is connected to its cathode via choke coil CWc and a gating coil Gc. The secondary of the ignition coil Ic is connected to the rotating arm of a distributor D which has a plurality of fixed contacts connected to spark plugs such as Pc as in a conventional distributor arrangement. In the embodiment of FIGURE 4, gating of the SCR S2c is provided to be in coincidence with the location of the rotating arm of the distributor D at one of the contacts such that firing of the individual plugs will occur at the proper time. The gating coils FC1c and FC2c and the choke winding CWc are selected to provide a varying phase shift or alteration in wave shape such that over the operating speed range of the engine the proper spark advance will be provided. Note that in the embodiment shown in FIGURE 4, only one ignition coil Ic is required since a distributor D is used. Again, as in the discussion of FIGURE 3, the charging winding Wc could be connected as a regulating winding such as winding R, shown in FIGURE 1, and hence perform the dual function of regulating as well as providing for the charge current to the capacitor C2c. Note that in the embodiment shown in FIGURE 4, only one set of firing coils FC1c and FC2c need be provided for a plurality of cylinders. However, the magnetic field on the rotor will then have to be distorted in the manner as shown in FIGURE 5 at a plurality of positions to provide for a multiple number of pulses through the distributor D to accommodate the number of cylinders.

With the embodiments as shown, it is contemplated that the alternator would be connected directly to the crankshaft of the engine such that no slippage, i.e., as through a belt drive, would occur.

While in FIGURE 5 the gating signal is provided by means of coils FC1 and FC2 and by alteration of the equal distribution of the north and south poles about the circumference of the rotor 20 of the alternator, it can be appreciated that this gating signal could be provided by a multitude of constructions. For example, rather than the substitution of a north for a south pole in the selected position as shown in FIGURE 5, the elimination of one pole at the selected position could result in the trigger pulse. Another construction would be to offset the poles relative to each other at the selected position such that when the gate winding coils FC1 and FC2 moved through that location firing would occur.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In combination with an electrical generating device for generating electrical power for an engine and having a rotor and a stator and adapted to be driven by the engine which has a spark ignition system, and with the device having first field means on one of the rotor and stator for providing a magnetic field thereabout and winding means on the other of the rotor and stator for generating an electrical potential from the magnetic field for use by the engine, the improvement comprising: energy storage means for storing electrical energy and for delivering pulses of electrical energy to the ignition system responsively to trigger signals, and trigger means responsive to the positional relationship between the rotor and stator for providing said trigger signals at selected positions as the rotor and stator are rotated relatively through said selected positions, said trigger means comprising second field means for providing with said first field means a total magnetic field distribution having areas of distortion corresponding to said selected positions and coil means responsive to said areas of distortion for providing said trigger signals.

2. In combination with an electrical generating device for generating electrical power for an engine and having a rotor and a stator and adapted to be driven by the engine which has a spark ignition system, and with the device having first field means on one of the rotor and stator for providing a magnetic field thereabout and winding means on the other of the rotor and stator for generating an electrical potential from the magnetic field for use by the engine, the improvement comprising: energy storage means for storing electrical energy and for delivering pulses of electrical energy to the ignition system responsively to trigger signals, said energy storage means including circuit means connected to the generating device for receiving its stored energy therefrom, and trigger means responsive to the positional relationship between the rotor and stator for providing said trigger signals at selected positions as the rotor and stator are rotated relatively through said selected positions, said trigger means comprising second field means for providing with said first field means a total magnetic field distribution having areas of distortion corresponding to said selected positions and coil means responsive to said areas of distortion for providing said trigger signals.

3. In combination with an electrical generating device for generating electrical power for an engine and having a rotor and a stator and adapted to be driven by the engine which has a spark ignition system which includes an ignition coil, and with the device having first field means on one of the rotor and stator for providing a magnetic field thereabout and winding means on the other of the rotor and stator for generating an electrical potential from the magnetic field for use by the engine, the improvement comprising: energy storage means for storing electrical energy and for delivering pulses of electrical energy to the ignition system responsively to trigger signals, said energy storage means including a capacitor, first circuit means for electrically connecting said capacitor across the ignition coil responsively to said trigger pulses, and second circuit means for connecting said capacitor to the generating device whereby said capacitor receives its stored energy from the generating device, and trigger means responsive to the positional relationship between the rotor and stator for providing said trigger signals at selected positions as the rotor and stator are rotated relatively through said selected positions, said trigger means comprising second field means for providing with said first field means a total magnetic field distribution having areas of distortion corresponding to said selected positions and coil means responsive to said areas of distortion for providing said trigger signals.

4. In combination with an electrical generating device for generating electrical power for an engine and having a rotor and a stator and adapted to be driven by the engine which has a spark ignition system in which an ignition coil is directly connected to one or more spark plugs, and with the device having first field means on one of the rotor and stator for providing a magnetic field thereabout and winding means on the other of the rotor and stator for generating an electrical potential from the magnetic field for use by the engine, the improvement comprising: energy storage means for storing electrical energy and a solid state switch means electrically connected to the ignition coil for delivering pulses of electrical energy to the ignition coil responsively to trigger signals, and trigger means responsive to the positional relationship between the rotor and stator for providing said trigger signals at selected positions as the rotor and stator are rotated relatively through said selected positions, said trigger means comprising second field means for providing with said first field means a total magnetic field distribution having areas of distortion corresponding to said selected positions and coil means responsive to said areas of distortion for providing said trigger signals.

[5. In combination with an electrical generating device for generating electrical power for an engine and having a rotor and a stator and adapted to be driven by the engine which has a spark ignition system, the improvement comprising: energy storage means for storing electrical energy and for delivering pulses of electrical energy to the ignition system responsively to trigger signals, and means responsive to the positional relationship between the rotor and stator for providing said trigger signals at selected positions as the rotor and stator are rotated relatively through said selected positions, said last named means including generating means fixed to and integral with the rotor and stator for generating said trigger pulses.]

6. In combination with an electrical generating device for generating electrical power for an engine and having a rotor and a stator and adapted to be driven by the engine which has a spark ignition system, the improvement comprising: energy storage means for storing electrical energy and for delivering pulses of electrical energy to the ignition system responsively to trigger signals, means responsive to the positional relationship between the rotor and stator for providing said trigger signals at selected positions as the rotor and stator are rotated relatively through said selected positions, said last named means including a pair of coils connected in an electrical relationship whereby normally bucking potentials are generated therein, and means located at said selected positions for causing additive potentials to be generated in said coils at said selected positions.

7. In combination with an electrical generating device for generating electrical power for an engine and having a rotor and a stator and adapted to be driven by the engine which has a spark ignition system, the improvement comprising: energy storage means for storing electrical energy and for delivering pulses of electrical energy to the ignition system responsively to trigger signals, *trigger* means responsive to the positional relationship between the rotor and stator for providing said trigger signals at selected positions as the rotor and stator are rotated relatively through said selected positions, and *said trigger* means *including means* fixed to and integral with the rotor and stator and *including further means* responsive to the frequency of said trigger pulses for varying the wave shape of said trigger signals for automatically advancing and retarding the time of delivery of the energy in said storage means to the ignition system whereby automatic spark advance and retardation is provided.

8. In combination with an electrical generating device for generating electrical power for an engine and having a rotor and a stator and adapted to be driven by the engine which has a spark ignition system, the improvement comprising: energy storage means for storing electrical energy and for delivering pulses of electrical energy to the ignition system responsively to trigger signals, and means responsive to the positional relationship between the rotor and stator for providing said trigger signals at selected positions as the rotor and stator are rotated relatively through said selected positions, and last named means including a pair of coils fixed to one of the rotor and stator and connected in an electrical relationship whereby normally bucking potentials are generated therein and magnetic field means located on the other of the rotor and stator at said selected positions for causing additive potentials to be generated in said coils at said selected positions.

9. In combination with an electrical generating device for generating electrical power for an engine and having a rotor and a stator with a load winding mounted on pole members on one and adapted to be driven by the engine which has a spark ignition system, the improvement comprising: energy storage means for storing electrical energy and for delievering pulses of electrical energy to the ignition system responsively to trigger signals, and means responsive to the positional relationship between the rotor and stator for providing said trigger signals at selected positions as the rotor and stator are rotated relatively through said selected positions, said last named means including a trigger winding mounted on one of the pole members.

10. In combination with an electrical generating device for generating electrical power for an engine and having a rotor and a stator adapted to be driven by the engine which has a spark ignition system, and with the device having first field means on one of the rotor and stator for providing a magnetic field thereabout and winding means on the other of the rotor and stator for generating an electrical potential from the magnetic field for use by the engine, the improvement comprising: energy storage means for storing electrical energy and for delivering pulses of electrical energy to the ignition system responsively to trigger signals, winding means located on the electrical generating device for generating the energy for said energy storage means, and electrical circuit means for connecting said winding means to the load windings of the electrical generating device for regulating the output from the load windings of the electrical generating device, and trigger means responsive to the positional relationship between the rotor and stator for providing said trigger signals at selected positions as the rotor and stator are rotated relatively through said selected positions, said trigger means comprising second field means for providing with said first field means a total magnetic field distribution having areas of distortion corresponding to said selected positions and coil means responsive to said areas of distortion for providing said trigger signals.

11. In combination with an electrical generating device for generating electrical power for an engine and having a rotor and a stator with a load winding mounted on poles on the one and a structure for generating a magnetic field located on the other and adapted to be driven by the engine which has a spark ignition system, the improvement comprising: energy storage means for storing electrical energy and for delivering pulses of electrical energy to the ignition system responsively to trigger signals, and means responsive to the positional relationship between the rotor and stator for providing said trigger signals at selected positions as the rotor and stator are rotated relatively through said selected positions, said last named means including a pair of coils fixed to different ones of the poles with the load winding and connected to an electrical relationship whereby normally bucking potentials are generated from the magnetic field and means for distorting the magnetic field pattern at said selected positions for causing additive potentials to be generated in said coils at said selected positions.

12. In combination with an electrical generating device for generating electrical power for an engine and having a rotor and a stator and adapted to be driven by the engine which has a spark ignition system which includes a distributor for sequentially connecting the spark plugs of the engine to the ignition coil, and with the device having first field means on one of the rotor and stator for providing a magnetic field thereabout and winding means on the other of the rotor and stator for generating an electrical potential from the magnetic field for use by the engine, the improvement comprising: energy storage means for storing electrical energy and for delivering pulses of electrical energy to the ignition coil responsively to trigger signals, and trigger means responsive to the positional relationship betweenthe rotor and stator for providing said trigger signals at selected positions an the rotor and stator are rotated relatively through said selected positions, said selected positions selected to coincide in time with the various positions of the distributor at which the spark plugs are connected to the ignition coil whereby the energy from said energy storage means will fire the spark plugs via the ignition coil, said trigger means comprising second field means for providing with said first field means a total magnetic field distribution having areas of distortion corresponding to said selected positions and coil means responsive to said areas of distortion for providing said trigger signals.

13. In combination with an electrical generating device for generating electrical power for an engine and for charging a battery and having rotor and stator members with a load winding located on poles on one of the members and with a structure for generating a magnetic field located on the other of the members and adapted to be driven by the engine which has a spark ignition system including an ignition coil, the improvement comprising: a regulating winding located on poles on that one of the members, a first controlled conduction element having a conductive and a non-conductive condition, first circuit means including said first controlled conduction element connecting said regulating winding across the battery and second circuit means connected to the battery and to said first controlled conduction element for rendering said first controlled conduction element conductive responsively to the battery potential reaching a preselected magnitude for connecting said regulating winding across the battery through a low impedance path, energy storage means for storing electrical energy and for delivering pulses of electrical energy to the ignition coil responsively to trigger signals, said energy storage means including a capacitor, a diode, a charge winding located on poles on the one of the members, and third circuit means connecting said charge winding for charging said capacitor through said diode, and means responsive to the positional relationship between the rotor and stator for providing said trigger signals at selected positions as the rotor and stator are rotated relatively through said selected positions, said last named means comprising a pair of coils located upon poles on that one of the members and connected in an electrical relationship whereby normally bucking potentials are generated therein and means located in the structure for generating the magnetic field for distorting the magnetic field pattern at said selected positions for causing additive potentials to be generated in said coils at said selected positions, and time means responsive to the frequency of said trigger pulses for automatically advancing and retarding the time of delivery of the energy in said capacitor to the ignition coil.

14. The apparatus of claim 13 with said time means including the choke coil.

15. The apparatus of claim 13 with said time means including means for clipping said trigger pulses.

16. In combination with an electrical generating device for generating electrical power for an engine and for charging a battery and having rotor and stator members with a load winding located on poles on one of the members and with a structure for generating a magnetic field located on the other of the members and adapted to be driven by the engine which has a spark ignition system including an ignition coil, the improvement comprising: a regulating winding located on poles on that one of the members, and second controlled conduction elements each with a load circuit and a gate circuit, said load circuit being rendered conductive upon application of a signal to said gate circuit, first circuit means including said load circuit of said first controlled conduction element connecting said regulating winding across the battery and second circuit means connected to the battery and to said gate circuit of said first controlled conduction element for rendering said load circuit of said first controlled conduction element conductive responsively to the battery potential reaching a preselected magnitude for connecting said regulating winding across the battery through a low impedance path, energy storage means for storing electrical energy and for delivering pulses of electrical energy to the ignition coil responsively to trigger signals, said energy storage means including a capacitor, a diode, a charge winding located on poles on that one of the elements, and third circuit means connecting said charge winding for charging said capacitor through said diode, fourth circuit means including said load circuit of said second controlled conduction element connecting said capacitor across the ignition coil, and trigger means responsive to the positional relationship between the rotor and stator for providing said trigger signals at selected positions as the rotor and stator are rotated relatively through said selected positions, said trigger means comprising a pair of coils located upon poles on that one of the members and connected in an electrical relationship whereby normally bucking potentials are generated therein, and fifth circuit means connecting said coils to said gate circuit of said second controlled conduction element for transmitting said trigger signals to said gate circuit, and field means in the structure for generating the magnetic field for distorting the magnetic field pattern at said selected positions for causing additive potentials to be generated in said coils at said selected positions, said field means including a plurality of north and south pole elements alternately distributed at equal angular intervals about the circumference of the other member except at said selected positions, and means responsive to the frequency of said trigger pulses for automatically advancing and retarding the time of delivery of the energy in said capacitor to the ignition coil.

17. The apparatus of claim 16 with said field means including a plurality of permanent magnet elements distributed with north and south poles alternating and at equal angular intervals about the circumference of the other member except at said selected positions at which at least two consecutive ones of said magnet elements are of the same polarity.

18. The apparatus of claim 16 with said field means including a plurality of permanent magnet elements distributed with north and south poles alternating and at equally angularly spaced positions about the circumference of the other member except at said selected positions at which that one of said spaced positions does not have one of said magnet elements of alternate polarity with respect to an adjacent one of said spaced positions.

19. In combination with an electrical generating device for generating electrical power for an engine and having a rotor and a stator and adapted to be driven by the engine which has a spark ignition system, the improvement comprising: energy storage means for storing electrical energy and for delivering pulses of electrical energy to the ignition system responsively to trigger signals, and trigger means responsive to the positional relationship between the rotor and stator for providing said trigger signals at selected positions as the rotor and stator are rotated relatively through said selected positions, said trigger means including field means comprising a plurality of permanent magnet element distributed with north and south poles alternating and at equal angular intervals about the circumference of one of the rotor and stator except at said selected positions at which at least two consecutive ones of said magnet elements are of the same polarity.

20. In combination with an electrical generating device for generating electrical power for an engine and having a rotor and a stator and adapted to be driven by the engine which has a spark ignition system, the improvement comprising: energy storage means for storing electrical energy and for delivering pulses of electrical energy to the ignition system responsively to trigger signals, and trigger means responsive to the positional relationship between the rotor and stator for providing said trigger signals at selected positions as the rotor and stator are rotated relatively through said selected positions, said trigger means including a plurality of permanent magnet elements distributed with north and south poles alternating and at equally angularly spaced positions about the circumference of one of the rotor and stator except at said selected positions at which that one of said spaced positions does not have one of said magnet elements of alternate polarity with respect to an adjacent one of said spaced positions.

21. In combination with an electrical generating device for generating electrical power for an engine and for charging a battery and having rotor and stator members with a load winding located on poles on one of the members and with a structure for generating a magnetic field located on the other of the members and adapted to be driven by the engine which has a spark ignition system including an ignition coil, the improvement comprising: energy storage means for storing electrical energy and for delivery pulses of electrical energy to the ignition coil responsively to trigger signals, said energy storage means including a capacitor, a diode, a charge winding located on poles on that one of the members, and first circuit means connecting said charge winding for charging said capacitor through said diode, second circuit means including said load circuit of said controlled conduction element connecting said capacitor across the ignition coil, and trigger means responsive to the positional relationship between the rotor and stator for providing said trigger signals at selected positions as the rotor and stator are rotated relatively through said selected positions, said trigger means comprising a pair of trigger coils located upon poles on that one of the members and connected in an electrical relationship whereby normally bucking potentials are generated therein, and third circuit means connecting said coils to said gate circuit of said controlled conduction element for transmitting said trigger signals to said gate circuit, and field means located in the structure for generating the magnetic field for distorting the magnetic field pattern at said selected positions for causing additive potentials to be generated in said coils at said selected positions, and time means responsive to the frequency of said trigger pulses for automatically advancing and retarding the time of delivery of the energy in said capacitor to the ignition coil.

22. In combination with an electrical generating device for generating electrical power for an engine and for charging a battery and having rotor and stator members with a load winding located on poles on one of the members and with a structure for generating a magnetic field located on the other of the members and adapted to be driven by the engine which has a spark ignition system including an ingition coil, the improvement comprising: energy storage means for storing electrical energy and for delivering pulses of electrical energy to the ignition coil responsively to trigger signals, said energy storage means including a capacitor, a diode, a charge winding located on poles on that one of the members, and first circuit means connecting said charge winding for charging said capacitor through said diode, second circuit means including said load circuit of said controlled conduction element connecting said capacitor across the ignition coil, trigger means responsive to the positional relationship between the rotor and stator for providing said trigger signals at selected positions as the rotor and stator are rotated relatively through said selected positions, said trigger means comprising a pair of trigger coils located upon poles on that one of the members and connected in an electrical relationship whereby normally bucking potentials are generated therein, third circuit means connecting said coils to said gate circuit of said controlled conduction element for transmitting said trigger signals to said gate circuit, field means located in the structure for generating the magnetic field for distorting the magnetic field pattern at said selected positions for causing additive potentials to be generated in said coils at said selected positions, and time means responsive to the frequency of said trigger pulses for automatically advancing and retarding the time of delivery of the energy in said capacitor to the ignition coil, said time means comprising a choke coil and said trigger means including a second diode connected in series with said trigger coils and with a zener diode connected in parallel across said choke coil, said second diode and said coils.

23. In combination with an electrical generating device for generating electrical power for an engine and for charging a battery and having rotor and stator members with a load winding located on poles on one of the members and with a structure for generating a magnetic field located on the other of the members and adapted to be driven by the engine which has a spark ignition system including an ignition coil, the improvement comprising: energy storage means for storing electrical energy and for delivering pulses of electrical energy to the ignition coil responsively to trigger signals, said energy storage means including a capacitor, a diode, a charge winding located on poles on that one of the members, and first circuit means connecting said charge winding for charging said capacitor through said diode, second circuit means including said load circuit of said controlled conduction element connecting said capacitor across the ignition coil, trigger means responsive to the positional relationship between the rotor and stator for providing said trigger signals at selected positions as the rotor and stator are rotated relatively through said selected positions, said trigger means comprising a pair of trigger coils located upon poles on that one of the members and connected in an electrical relationship whereby normally bucking potentials are generated therein, third circuit means connecting said coils to said gate circuit of said controlled conduction element for transmitting said trigger signals to said gate circuit, field means located in the structure for generating the magnetic field for distorting the magnetic field pattern at said selected positions for causing additive potentials to be generated in said coils at said selected positions, time means responsive to the frequency of said trigger pulses for automatically advancing and retarding the time of delivery of the energy in said capacitor to the ignition coil, and regulating circuit means for sensing the potential across the battery and for providing a low impedance path thereacross in response to a potential of a preselected magnitude with said low impedance path including said charge winding.

24. In combination with an electrical generating device for generating electrical power for an engine and for charging a battery and having rotor and stator members with a load winding located on poles on one of the members and with a structure for generating a magnetic field located on the other of the members and adapted to be driven by the engine which has a spark ignition system including an ignition coil, the improvement comprising: energy storage means for storing electrical energy and for delivery pulses of electrical energy to the ignition coil respectively to trigger signals, said energy storage means including a capacitor, a diode, a charge winding located on poles on that one of the members, and first circuit means connecting said charge winding for charging said capacitor through said diode, second circuit means including said load circuit of said controlled conduction element connecting said capacitor across the ignition coil, trigger means responsive to the positional relationship between the rotor and stator for providing said trigger signals at selected positions at the rotor and stator are rotated relatively through said selected positions, said trigger means comprising a pair of trigger coils located upon poles on that one of the members and connected in an electrical relationship whereby normally bucking potentials are generated therein, third circuit means connecting said coils to said gate circuit of said controlled conduction element for transmitting said trigger signals to said gate circuit, field means located in the structure for generating the magnetic field for distorting the magnetic field pattern at said selected positions for causing additive potentials to be generated in said coils at said selected positions, and time means responsive to the frequency of said trigger pulses for automatically advancing and retarding the time of delivery of the energy in said capacitor to the ignition coil, said time means comprising a pair of inductively coupled choke coils and said trigger means including circuit means serially connecting one of said choke coils with said trigger coils and the other of said choke coils in parallel with said one of said choke coils and said trigger coils.

25. In combination with an electrical generating device for generating electrical power for an engine and for charging a battery and having rotor and stator elements with a load winding located on poles on one of the elements and with a structure for generating a magnetic field located on the other of the elements and adapted to be driven by the engine which has a spark ignition system including an ignition coil and a distributor consecutively connecting the ignition coil to the spark plugs of the engine, the improvement comprising: a controlled conduction element with a load circuit and a gate circuit, said load circuit being rendered conductive upon application of a signal to said gate circuit, energy storage means for storing electrical energy and for delivering pulses of electrical energy to the ignition coil responsively to trigger signals, said energy storage means including a capacitor, a diode, a charge winding located on poles on that one of the members, and first circuit means connecting said charge winding for charging said capacitor through said diode, second circuit means including said load circuit of said controlled conduction element connecting said capacitor across the ignition coil, and trigger means responsive to the positional relationship between the rotor and stator for providing said trigger signals at selected positions as the rotor and stator are rotated relatively through said selected positions, said trigger means comprising a trigger coil located upon a pole on that one of the members, and timing means responsive to the frequency of said trigger pulses for automatically advancing and retarding the time of delivery of the energy in said capacitor to the ignition coil.

26. In combination with an electrical generating device for generating electrical power for an engine and for charging a battery and having rotor and stator elements with a load winding located on poles on one of the elements and with a structure for generating a magnetic field located on the other of the elements and adapted to be driven by the engine which has a spark ignition system including an ignition coil and a distributor consecutively connecting the ignition coil to the spark plugs of the engine, the improvement comprising: a controlled conduction element with a load circuit and a gate circuit, said load circuit being rendered conductive upon application of a signal to said gate circuit, energy storage means for storing electrical energy and for delivering pulses of electrical energy to the ignition coil respectively to trigger signals, said energy storage means including a capacitor, a diode, a charge winding located on poles on that one of the members, and first circuit means connecting said charge winding for charging said capacitor through said diode, second circuit means, including said load circuit of said controlled conduction element connecting said capacitor across the ignition coil, and trigger means responsive to the positional relationship between the rotor and stator for providing said trigger signals at selected positions as the rotor and stator are rotated relatively through said selected positions, said trigger means comprising a trigger coil located upon a pole on that one of the members, and timing means responsive to the frequency of said trigger pulses for automatically advancing and retarding the time of delivery of the energy in said capacitor to the ignition coil, said timing means including a choke coil.

27. In combination with an electrical generating device for generating electrical power for an engine and for charging a battery and having rotor and stator elements with a load winding located on poles on one of the elements and with a structure for generating a magnetic field located on the other of the elements and adapted to be driven by the engine which has a spark ignition system including an ignition coil and a distributor consecutively connecting the ignition coil to the spark plugs of the engine, the improvement comprising: a controlled conduction element with a load circuit and a gate circuit, said load circuit being rendered conductive upon application of a signal to said gate circuit, energy storage means for storing electrical energy and for delivering pulses of electrical energy to the ignition coil responsively to trigger signals, said energy storage means including a capacitor, a diode, a charge winding located on poles on that one of the members, and first circuit means connecting said charge winding for charging said capacitor through said diode, second circuit means including said load circuit of said controlled conduction element connecting said capacitor across the ignition coil, and trigger means responsive to the positional relationship between the rotor and stator for providing said trigger signals at selected positions as the rotor and stator are rotated relatively through said selected positions, said trigger means comprising a trigger coil located upon a pole on that one of the members, and timing means responsive to the frequency of said trigger pulses for automatically advancing and retarding the time of delivery of the energy in said capacitor to the ignition coil, said timing means including a choke coil and said trigger means including circuit means serially connecting said choke coil and said trigger coil and connecting said choke coil and said trigger coil across said gate circuit of said controlled conduction element.

28. In combination with an electrical generating device for generating electrical power for an engine and for charging a battery and having rotor and stator elements with a load winding located on poles on one of the elements and with a structure for generating a magnetic field located on the other of the elements and adapted to be driven by the engine which has a spark ignition system including an ignition coil and a distributor consecutively connecting the ignition coil to the spark plugs of the engine, the improvement comprising: a controlled conduction element with a load circuit and a gate circuit, said load circuit being rendered conductive upon application of a signal to said gate circuit, energy storage means for storing electrical energy and for delivering pulses of electrical energy to the ignition coil responsively to trigger signals, said energy storage means including a capacitor, a diode, a charge winding located on poles on that one of the members, and first circuit means connecting said charge winding for charging said capacitor through said diode, second circuit means including said load circuit of said controlled conduction element connecting said capacitor across the ignition coil, and trigger means responsive to the positional relationship between the rotor and stator for providing said trigger signals at selected positions as the rotor and stator are rotated relatively through said selected positions, said trigger means comprising a trigger coil located upon a pole on that one of the members, timing means responsive to the frequency of said trigger pulses for automatically advancing and retarding the time of delivery of the energy in said capacitor to the ignition coil, and regulating circuit means for sensing the potential across the battery and for providing a low impedance path thereacross in response to a potential of a preselected magnitude with said low impedance path including said charge winding.

[29. In combination with an electrical generating device for generating electrical power for an engine and having a rotor and a stator and adapted to be driven by the engine which has a spark ignition system, the improvement comprising: energy storage means for storing electrical energy and for delivering pulses of electrical energy to the ignition system responsively to trigger signals, and means responsive to the positional relationship between the rotor and stator for providing said trigger signals at selected positions as the rotor and stator are rotated relatively through said selected positions, said last named means including generating means for generating said trigger pulses, said generating means comprising a coil for providing said trigger signals, field means for providing a magnetic field for said coil and first means responsive to relative rotation between the rotor and stator for providing a rate of change in the magnetic field for said coil at said selected positions whereby said coil provides said trigger signals, at least one of said coil, said field means, and said first means being fixed to and integral with one of the rotor and stator.]

[30. The combination of claim 29 with said coil, said field means, and said first means being fixed to and integral with the rotor and stator.]

*31. In combination with an electrical generating device for generating electrical power for an engine and having a rotor and a stator and adapted to be driven by the engine which has a spark ignition system, which includes an ignition coil, and with the device having winding means on the stator on a plurality of pole member having radially facing end surfaces for generating an electrical potential for use by the engine, the improvement comprising: energy storage means for storing electrical energy and for delivering pulses of electrical energy to the ignition system responsively to trigger signals, said energy storage means including a capacitor, first circuit means for electrically connecting said capacitor across the ignition coil responsively to said trigger signals and second circuit means for connecting said capacitor to the winding means whereby said capacitor receives its stored energy from said winding means and means responsive to the positional relationship between the rotor and stator for providing said trigger signals at selected positions as the rotor and stator are rotated relatively through said selected positions, said last named means including generating means for generating said trigger signals, said generating means comprising a coil separate from said winding means for providing said trigger signals, field means for providing a radially directed magnetic field for said coil and for the winding means, said field means comprising a plurality of equally spaced circumferentially disposed permanent magnets having radially facing magnetic poles having a circumferentially non-uniform magnetic polar distribution for providing a non-uniform magnetic field distribution circumferentially about the rotor with said selected positions determined by said non-uniform field distribution, and first means responsive to*

*relative rotation between the rotor and stator for providing a rate of change in the magnetic field for said coil at said selected positions whereby said coil provides said trigger signals, at least one of said coil, said field means, and said first means being fixed to and integral with one of the rotor and stator, said first means being fixed to and integral with one of the rotor and stator and comprising a radially extending member having a radially facing end surface magnetically coupling said field means to said coil at said selected positions, said magnetic field means and said radially extending member being generally in axial alignment with the pole members whereby an axially compact structure can be provided.*

*32. In combination with an electrical generating device for generating electrical power for an engine and having a rotor and a stator and adapted to be driven by the engine which has a spark ignition system, which includes an ignition coil, and with the device having winding means on the stator on a pluralty of pole members having radially facing end surfaces for generating an electrical potential for use by the engine, the improvement comprising: energy storage means for storing electrical energy and for delivering pulses of electrical energy to the ignition system responsively to trigger signals, said energy storage means including a capacitor, first circuit means for electrically connecting said capacitor across the ignition coil responsively to said trigger signals and second circuit means for connecting said capacitor to the winding means whereby said capacitor receives its stored energy from said winding means, said second circuit means including a diode connected between said winding means and said capacitor whereby said capacitor can receive its charge from said winding means and will maintain this charge after the potential at said winding means falls below the magnetitude of said charge, and means responsive to the positional relationship between the rotor and stator for providing said trigger signals at selected position as the rotor and stator are rotated relatively through said selected positions, said last named means including geenrating means for generating said trigger signals, said generating means comprising a coil separate from said winding means for providing said trigger signals, field means for providing a radially directed magnetic field for said coil and for the winding means, said field means comprising a plurality of circumferentially radially facing permanent magnet poles providing a circumferentially extending field for generating said electrical potential in said winding means and having at least one field portion which has a distinctive flux distribution relative to the remaining field portion and which is substantially limited in circumferential extension, said selected positions being determined by said at least one field portion, and first means responsive to relative rotation between the rotor and stator for providing a rate of change in the magnetic field for said coil at said selected positions whereby said coil provides said trigger isgnals, at least one of said coil, said field means, and said first means being fixed to and integral with one of the rotor and stator, said first means being fixed to and integral with one of the rotor and stator and comprising a radially extending member having a radially facing end surface magnetically coupling said field means to said coil at said selected positions, said magnetic field means and said radially extending member being generally in the same radial plane with the pole members whereby an axially compact structure can be provided, and means responsive to the wave shape of said trigger signals for automatically advancing and retarding the time of delivery of the energy in said storage means to the ignition system whereby automatic spark advance and retardation is provided.*

*33. In combination with an electrical generating device for generating electrical power for an engine and having a rotor and a stator and adapted to be driven by the engine which has a spart ignition system, which includes an ignition coil, and with the device having winding means on the stator on a plurality of pole members having radially facing end surfaces for generating an electrical potential for use by the engine, the improvement comprising: energy storage means for storing electrical energy and for delivering pulses of electrical energy to the ignition system responsively to trigger signals, said energy storage means including a capacitor, first circuit means for electrically connecting said capacitor across the ignition coil responsively to said trigger signals and second circuit means for connecting said capacitor to the winding means whereby said capacitor receives its stored energy from said winding means and said second circuit means including a diode connected between said winding means and said capacitor whereby said capacitor can receive its charge from said winding means and will maintain this charge after the potential at said winding means falls below the magnitude of said charge, and means responsive to the positional relationship between the rotor and stator for providing said trigger signals at selected positions as the rotor and stator are rotated relatively through said selected positions, said last named means including generating means for generating said trigger signals, said generating means comprising a coil separate from said winding means for providing said trigger signals, field means for providing a radially directed magnetic field for said coil and for the winding means, said field means comprising a plurality of circumferentially disposed radially facing permanent magnet poles providing a ciricumferentially extending field for generating said electrical potential in said winding means and having at least one field portion which has a distinctive flux distribution relative to the remaining field portion and which is substantially limited in circumferential extension, said selected positions being determined by said at least one field portion, and first means responsive to relative rotation between the rotor and stator for providing a rate of change in the magnetic field for said coil at said selected positions whereby said coil provides said trigger signals, at least one of said coil, said field means, and said first means being fixed to and integral with one of the rotor and stator, said first means being fixed to and integral with one of the rotor and stator and comprising at least two radially extending members having radially facing end surfaces magnetically coupling said field means to said coil at said selected positions, said magnetic field means and said radially extending members being generally in the same radial plane with the pole members whereby an axially compact structure can be provided.*

*34. In combination with an electrical generating device for generating electrical power for an engine and having a rotor and a stator and adapted to be connected to the engine crankshaft to be driven by the engine which has a spark ignition system, which includes an ignition coil, and with the device having winding means on the stator on a plurality of pole members having radially facing end surfaces for generating an electrical potential for use by the engine, the improvement comprising: energy storage means for storing electrical energy and for delivering pulses of electrical energy to the ignition system responsively to trigger signals, said energy storage means including a capacitor, first circuit means for electrically connecting said capacitor across the ignition coil responsively to said trigger signals and second circuit means for connecting said capacitor to the winding means whereby said capacitor receives its stored energy from the winding means, said second circuit means including a diode connected between said winding means and said capacitor whereby said capacitor can receive its charge from said winding means and will maintain this charge after the potential at said winding means falls below the magnitude of said charge, and means responsive to the posi-*

*tional relationship between the rotor and stator for providing said trigger signals at selected positions as the stator are rotated relatively through said selected positions, said last named means including generating means for generating said trigger signals, said generating means comprising a coil separate from said winding means for providing said trigger signals, field means for providing a radially directed magnetic field for said coil and for the winding means, said field means comprising a plurality of circumferentially disposed radially facing permanent magnet poles providing a circumferentially extending field for generating said electrical potential in said winding means and having at least one field portion which has a distinctive flux distribution relative to the remaining field portion and which is substantially limited in circumferential extension, said selected positions being determined by said at least one field portion, and first means coupling the magnetic field for said coil to said coil for a circumferential length greater than the circumferential length of one of said permanent magnets responsive to relative rotation between the rotor and stator for providing a rate of change in the magnetic field for said coil at said selected positions whereby said coil provides said trigger signals, and at least one of said coil, said field means, and said first means being fixed to and integral with one of the rotor and stator, said first means being fixed to and integral with one of the rotor and stator and comprising at least two radially extending members having radially facing end surfaces magnetically coupling said field means to said coil at said selected positions, said magnetic field means and said radially extending members being generally in the same radial plane with the pole members whereby an axially compact structure can be provided, connecting means connecting the generating device directly to the crankshaft whereby no slippage occurs therebetween, and means responsive to the wave shape of said trigger signals for automatically advancing and retarding the time of delivery of the energy in said storage means to the ignition system whereby automatic spark advance and retardation is provided.*

*35. In combination with an electrical generating device for generating electrical power for an engine and having a coaxially mounted rotor and a stator and adapted to be driven by the engine which has a spark ignition system, which includes an ignition coil, and with the device having winding means on the stator on a plurality of pole members having radially facing end surfaces for generating an electrical potential for use by the engine, the improvement comprising: energy storage means for storing electrical energy and for delivering pulses of electrical energy to the ignition system responsively to trigger signals, said energy storage means including a capacitor, first circuit means for electrically connecting said capacitor across the ignition coil responsively to said trigger signals and second circuit means for connecting said capacitor to the winding means whereby said capacitor receives its stored energy from said winding means and said second circuit means including a diode connected between said winding means and said capacitor whereby said capacitor can receive its charge from said winding means and will maintain this charge after the potential a said winding means falls below the magnitude of said charge, and means responsive to the positional relationship between the rotor and stator for providing said trigger signals at selected positions as the rotor and stator are rotated relatively through said selected positions, said last named means including generating means for generating said trigger signals, said generating means comprising a coil separate from said winding means for providing said trigger signals, field means for providing a radially directed magnetic field for said coil and for the winding means, said field means comprising a plurality of circumferentially disposed radially facing permanent magnet poles, being generally in the same radial plane and providing a circumferentially extending field for generating said electrical potential in said winding means and having at least one field portion which has a distinctive flux distribution relative to the remaining field portion and which is substantially limited in circumferential extension, said selected positions being determined by said at least one field portion, and first means responsive to relative rotation between the rotor and stator for providing a rate of change in the magnetic field for said coil at said selected positions whereby said coil provides said trigger signals, at least one of said coil, said field means, and said first means being fixed to and integral with one of the rotor and stator.*

*36. In combination with an electrical generating device for generating electrical power for an engine and having a coaxially mounted rotor and a stator and adapted to be driven by the engine which has a spark ignition system, which includes an ignition coil, and with the device having a first field means including radially facing magnetic pole faces on one of the rotor and stator for providing a magnetic field radially directed in a radial plane and circumferentially disposed thereabout, said radial plane extending transversely to the axis of the rotor and stator and intersecting said pole faces, and winding means on the other of the rotor and stator for generating an electrical potential from the magnetic field for use by the engine, the improvement comprising: energy storage means for storing electrical energy and for delivering pulses of electrical energy to the ignition system responsively to trigger signals, said energy storage means including a capacitor, first circuit means for electrically connecting said capacitor across the ignition coil responsively to said trigger signals and second circuit means for connecting said capacitor to the winding means whereby said capacitor receives its stored energy from said winding means, and means responsive to the positional relationship between the rotor and stator for providing said trigger signals at selected positions as the rotor and stator are rotated relatively through said selected positions, said last named means including generating means comprising a coil separate from said winding means for providing said trigger signals, second field means different from said first field means including at least one different radially facing magnetic pole located axially generally to be intersected by said radial plane along with said pole faces of said first field means for providing a radially directed magnetic field in said radial plane for said coil which is coextensive, at least in part, with said radially extending magnetic field of said first field means so that there is a distinctive composite radially extending flux distribution of substantially limited circumferential extension established within said coextensive area, said selected position being determined by said distinctive composite flux distribution, and first means responsive to relative rotation between the rotor and stator for providing a rate of change in the magnetic field for said coil at said selected positions whereby said coil provides said trigger signals, at least one of said coil, said field means, and said first means being fixed to and integral with one of the rotor and stator, whereby an axially compact structure is provided.*

*37. In combination with an electrical generating device for generating electrical power for an engine and having a coaxially mounted rotor and a stator and adapted to be driven by the engine which has a spark ignition system, which includes an ignition coil, and with the device having a first field means including radially facing first magnetic poles on one of the rotor and stator for providing magnetic field radially directed in a radial plane and circumferentially disposed thereabout, said radial plane extending transversely to the axis of the rotor and stator and intersecting said first magnetic poles, and winding means on the other of the rotor and stator for generating an electrical potential from the magnetic field for* use by the engine, the improvement comprising: energy storage means for storing electrical energy and for delivering pulses of electrical energy to the ignition system responsively to trigger signals, said energy storage means including a capacitor, first circuit means for electrically connecting said capacitor across the ignition coil responsively to said trigger signals and second circuit means for connecting said capacitor to the winding means whereby said capacitor receives its stored energy from said winding means, and means responsive to the positional relationship between the rotor and stator for providing said trigger signals at selected positions as the rotor and stator are rotated relatively through said selected positions, said last named means including generating means for generating said trigger signals, said generating means comprising a coil for providing said trigger signals, second field means different from said first field means including at least one different radially facing magnetic pole located axially generally to be intersected by said radial plane along with said first magnetic poles of said first field means and providing a radially directed magnetic field in said radial plane for said coil which is coextensive, at least in part, with said radially extending magnetic field of said first field means so that there is a distinctive composite radially extending flux distribution of substantially limited circumferential extension established within said coextensive area, said selected position being determined by said distinctive composite flux distribution, and first means responsive to relative rotation between the rotor and stator for providing a rate of change in the magnetic field for said coil at said selected positions whereby said coil provides said trigger signals, said coil being separate from said winding means and being wound upon a core terminating in a radially facing pole portion intersected by said radial plane, at least one of said coil, said field means, and said first means being fixed to and integral with one of the rotor and stator, whereby an axially compact structure is provided.

38. The combination of claim 37 with said second circuit means including a diode connected between said winding means and said capacitor.

39. The combination of claim 38 with said winding means including charge winding means for providing the charge current to said capacitor through said diode and other winding means for providing electrical energy separately from said charge winding means.

40. In combination with an electrical generating device for generating electrical power for an engine and having a coaxially mounted rotor and a stator and adapted to be driven by the engine which has a spark ignition system, which includes an ignition coil, and with the device having a first field means including radially facing first magnetic poles on one of the rotor and stator for providing a magnetic field radially directed in a radial plane and circumferentially disposed thereabout, said radial plane extending transversely to the axis of the rotor and stator and intersecting said first magnetic poles, and winding means on the other of the rotor and stator for generating an electrical potential from the magnetic field for use by the engine, said first field means comprising a plurality of circumferentially disposed permanent magnets, the improvements comprising: energy storage means for storing electrical energy and for delivering pulses of electrical energy to the ignition system responsively to trigger signals, and means responsive to the positional relationship between the rotor and stator for providing said trigger signals at selected positions as the rotor and stator are rotated relatively through said selected positions, said last named means including generating means comprising a coil for providing said trigger signals, second field means including at least one different radially facing magnetic pole located axially to be intersected by said radial plane along with said first magnetic poles of said first field means for providing a radially directed magnetic field in said radial plane for said coil which is coextensive, at least in part, with said radially extending magnetic field of said first field means so that there is a distinctive composite radially extending flux distribution of substantially limited circumferential extension established within said coextensive area, said selected position being determined by said distinctive composite flux distribution, and first means coupling the magnetic field for said coil to said coil for a circumferential length greater than the circumferential length of one of said permanent magnets and responsive to relative rotation between the rotor and stator for providing a rate of change in the magnetic field for said coil at said selected positions whereby said coil provides said trigger signals, at least one of said coil, said field means, and said first means being fixed to and integral with one of the rotor and stator, whereby an axially compact structure is provided, and means responsive to the wave shape of said trigger signals for automatically advancing and retarding the time of delivery of the energy in said storage means to the ignition system whereby automatic spark advance and retardation is provided.

41. The combination of claim 40 with said coupling means coupling the magnetic field for said coil to said coil for a circumferential length of around the circumferential length of two of said permanent magnets.

42. In combination with an electrical generating device for generating electrical power for an engine and having a coaxially mounted rotor and a stator and adapted to be driven by the engine which has a spark ignition system, which includes an ignition coil, and with the device having a first field means including radially facing magnetic poles on one of the rotor and stator for providing a magnetic field radially directed in a radial plane and circumferentially disposed thereabout, said radial plane extending transversely to the axis of the rotor and stator, and winding means on the other of the rotor and stator for generating an electrical potential from the magnetic field for use by the engine, said first field means comprising a plurality of circumferentially disposed permanent magnets, the improvements comprising: energy storage means for storing electrical energy and for delivering pulses of electrical energy to the ignition system responsively to trigger signals, and means responsive to the positional relationship between the rotor and stator for providing said trigger signals at selected positions as the rotor and stator are rotated relatively through said selected positions, said last named means including generating means for generating said trigger pulses, said generating means comprising a coil for providing said trigger signals, second field means including at least one radially facing magnetic pole for providing a radially directed magnetic field for said coil which is coextensive, at least in part, with said radally extending magnetic field of said first field means so that there is a distinctive composite radially extending flux distribution of substantially limited circumferential extension established within said coextensive area, said selected position being determined by said distinctive composite flux distribution, the magnetic fields of said first and second field means being located to be intersected by said radial plane, and first means coupling the magnetic field for said coil to said coil for a circumferential length greater than the circumferential length of one of said permanent magnets and responsive to relative rotation between the rotor and stator for providing a rate of change in the magnetic field for said coil at said selected positions whereby said coil provides said trigger signals, said first means including at least two circumferentially spaced elements having radially facing poles intersected by said radial plane and extending from one of the rotor and stator for coupling the magnetic field for said coil to said coil, at least one of said coil, said field means, and said first means being fixed to and integral with one of the rotor and stator, whereby an axially compact structure is provided, and means responsive to the wave shape of said trigger signals for automatically advancing and retarding the time of delivery of the energy in said storage means to the ignition system whereby automatic spark advance and retardation is provided.

43. In combination with an electrical generating device for generating electrical power for an engine and having a coaxially mounted rotor and a stator and adapted to be driven by the engine which has a spark ignition system, which includes an ignition coil, and with the device having a first field means including radially facing magnetic poles on one of the rotor and stator for providing a magnetic field radially directed in a radial plane and circumferentially disposed thereabout, said radial plane extending transversely to the axis of the rotor and stator, and winding means on the other of the rotor and stator for generating an electrical potential from the magnetic field for use by the engine, the improvement comprising: energy storage means for storing electrical energy and for delivering pulses of electrical energy to the ignition system responsively to trigger signals, said energy storage means including a capacitor, first circuit means for electrically connecting said capacitor across the ignition coil responsively to said trigger signals and second circuit means for connecting said capacitor to the winding means whereby said capacitor receives its stored energy from said winding means, said second circuit means including a diode connected between said winding means and said capacitor whereby said capacitor can receive its charge from said winding means and will maintain this charge after the potential at said winding means falls below the magnitude of said charge, and means responsive to the positional relationship between the rotor and stator for providing said trigger signals at selected positions as the rotor and stator are rotated relatively through said selected positions, said last named means including generating means fixed to and integral with the rotor and stator for generating said trigger pulses, whereby an axially compact structure is provided, said generating means comprising second field means different from said first field means for providing a radially directed magnetic field located axially to be intersected by said radial plane along with the magnetic field of said first field means which is coextensive, at least in part, with said radially extending magnetic field of said first field means so that there is a distinctive composite radially extending flux distribution of substantially limited circumferential extension established within said coextensive area, said selected position being determined by said distinctive composite flux distribution, said winding means including charge winding means for providing the charge current to said capacitor through said diode and other winding means for providing electrical energy separately from said charge winding means.

44. In combination with an electrical generating device for generating electrical power for an engine and having a coaxially mounted rotor and a stator and adapted to be driven by the engine which has a spark ignition system, which includes an ignition coil, and with the device having a first field means on one of the rotor and stator for providing a magnetic field radially directed in a radial plane and circumferentially disposed thereabout, said radial plane extending transversely to the axis of the rotor and stator, and winding means on the other of the rotor and stator for generating an electrical potential from the magnetic field for use by the engine, the improvement comprisings: energy storage means for storing electrical energy and for delivering pulses of electrical energy to the ignition system responsively to trigger signals, said energy storage means including a capacitor, first circuit means for electrically connecting said capacitor across the ignition coil responsively to said trigger signals and second circuit means for connecting said capacitor to the winding means whereby said capacitor receives its stored energy from said winding means, and means responsive to the positional relationship between the rotor and stator for providing said trigger signals at selected positions as the rotor and stator are rotated relatively through said selected positions, said last named means including generating means for generating said trigger signals, said generating means comprising a coil separate from said winding means for providing said trigger signals, second field means different from said first field means and located axially generally to be intersected by said radial plane along with said first field means for providing a radially directed magnetic field for said coil which is coextensive, at least in part, with said radially extending magnetic field of said first field means so that there is a distinctive composite radially extending flux distribution of substantially limited circumferential extension established within said coextensive area, said selected position being determined by said distinctive composite flux distribution, and first means responsive to relative rotation between the rotor and stator for providing a rate of change in the magnetic field for said coil at said selected positions whereby said coil provides said trigger signals, at least one of said coil, said field means, and said first means being fixed to and integral with one of the rotor and stator, whereby an axially compact structure is provided, said first means being fixed to and integral with one of the rotor and stator and comprising a radially extending member having a radially facing end surface intersected by said radial plane magnetically coupling said second field means to said coil at said selected positions.

45. In combination with an electrical generating device for generating electrical power for an engine and having a coaxially mounted rotor and a stator and adapted to be driven by the engine which has a spark ignition system, which includes an ignition coil, and with the device having a field means on one of the rotor and stator for providing a magnetic field radially directed in a radial plane extending transversely to the axis of the rotor and stator, and winding means on the other of the rotor and stator for generating an electrical potential from the magnetic field for use by the engine, the improvement comprising: energy storage means for storing electrical energy and for delivering pulses of electrical energy to the ignition system responsively to trigger signals, said energy storage means including a capacitor, first circuit means for electrically connecting said capacitor across the ignition coil responsively to said trigger signals and second circuit means for connecting said capacitor to the winding means whereby said capacitor receives its stored energy from said winding means, and means responsive to the positional relationship between the rotor and stator for providing said trigger signals at selected positions as the rotor and stator are rotated relatively through said selected positions, said last named means including generating means for generating said trigger signals, said generating means comprising a coil separate from said winding means for providing said trigger signals, second field means different from said first field means and located axially generally to be intersected by said radial plane along with said first field means for providing a radially directed magnetic field in said radial plane for said coil which is coextensive, at least in part, with said radially extending magnetic field of said first field means so that there is a distinctive composite radially extending flux distribution of substantially limited circumferential extension established within said coextensive area, said selected position being determined by said distinctive composite flux distribution, and first means responsive to relative rotation between the rotor and stator for providing a rate of change in the magnetic field for said coil at said selected positions whereby said coil provides said trigger signals, at least one of said coil, said field means, and said first means being fixed to and integral with one of the rotor and stator, whereby an axially compact structure is provided, said first means being fixed to and integral with one of the rotor and stator and comprising a plurality of radially extending elements having radially facing end surfaces intersected by said radial plane magnetically coupling said second field means to said coil at said selected positions.

46. In combination with an electrical generating power for an engine and having a coaxially mounted rotor and a stator and adapted to be connected to the engine crankshaft to be driven by the engine which has a spark ignition system, which includes an ignition coil, and with the device having a first field means including radially facing magnetic poles on one of the rotor and stator for providing a magnetic field radially directed in a radial plane and circumferentially disposed thereabout, said radial plane extending transversely to the axis of the rotor and stator, and winding means on the other of the rotor and stator for generating an electrical potential from the magnetic field for use by the engine, said first field means comprising a plurality of circumferentially disposed permanent magnets, the improvement comprising: energy storage means for storing electrical energy and for delivering pulses of electrical energy to the ignition system responsively to trigger signals, said energy storage means including a capacitor, first circuit means for electrically connecting said capacitor across the ignition coil responsively to said trigger signals and second circuit means for connecting said capacitor to the winding means whereby said capacitor receives its stored energy from said winding means, and means responsive to the positional relationship between the rotor and stator for providing said trigger signals at selected positions as the rotor and stator are rotated relatively through said selected positions, said last named means including generating means for generating said trigger signals, said generating means comprising a coil separate from said winding means for providing said trigger signals, second field means different from said first field means including at least one different radially facing magnetic pole and located axially generally to be intersected by said radial plane along with said plurality of magnets of said first field means for providing a radially directed magnetic field in said radial plane for said coil which is coextensive, at least in part, with said radially extending magnetic field of said first field means so that there is a distinctive composite radially extending flux distribution of substantially limited circumferential extension established within said coextensive area, said selected position being determined by said distinctive composite flux distribution, and first means responsive to relative rotation between the rotor and stator for providing a rate of change in the magnetic field for said coil at said selected positions whereby said coil provides said trigger signals, said second field means comprising at least one permanent magnet, at least one of said coil, said field means, and said first means being fixed to and integral with one of the rotor and stator whereby an axially compact structure is provided, said first means being fixed to and integral with one of the rotor and stator and comprising a radially extending member having a radially facing end surface intersected by said radial plane magnetically coupling said second field means to said coil at said selected positions, and connecting means connecting the generating device directly to the crank-shaft whereby no slippage occurs therebetween.

47. In combination with an electrical generating device for generating electrical power for an engine and having a coaxially mounted rotor and a stator and adapted to be driven by the engine which has a spark ignition system which includes an ignition coil, and with the device having a first field means including radially facing magnetic poles on the rotor for providing a magnetic field radially directed in a radial plane and circumferentially disposed thereabout, said radial plane extending transversely to the axis of the rotor and stator, and winding means on the stator for generating an electrical potential from the magnetic field for use by the engine, said first field means comprising a plurality of circumferentially disposed permanent magnets supported on the rotor, the improvement comprising: energy storage means for storing electrical energy and for delivering pulses of electrical energy to the ignition system responsively to trigger signals, said energy storage means including a capacitor, first circuit means for electrically connecting said capacitor across the ignition coil responsively to said trigger signals and second circuit means for connecting said capacitor to the winding means whereby said capacitor receives its stored energy from said winding means, and means responsive to the positional relationship between the rotor and stator for providing said trigger signals at selected positions as the rotor and stator are rotated relatively through said selected positions, said last named means including generating means for generating said trigger signals, said generating means comprising a coil separate from said winding means for providing said trigger signals, second field means different from said first field means including at least one different radially facing magnetic pole and located axially generally to be intersected by said radial plane along with said plurality of permanent magnets of first field means for providing a radially directed magnetic field in said radial plane for said coil which is coextensive, at least in part, with said radially extending magnetic field of said first field means so that there is a distinctive composite radially extending flux distribution of substantially limited circumferential extension established within said coextensive area, said selected position being determined by said distinctive composite flux distribution, and first means responsive to relative rotation between the rotor and stator for providing a rate of change in the magnetic field for said coil at said selected positions whereby said coil provides said trigger signals, said second field means comprising a plurality of circumferentially disposed permanent magnets supported on the rotor, at least one of said coil, said field means, and said first means being fixed to and integral with one of the rotor and stator and comprising a radially extending member having a radially facing end surface intersected by said radial plane magnetically coupling said second field means to said coil at said selected positions.

48. In combination with an electrical generating device for generating electrical power for an engine and having a rotor and a stator and adapted to be connected to the engine crankshaft to be driven by the engine which has a spark ignition system which includes an ignition coil, with the device having winding means on the stator, the improvement comprising: energy storage means for storing electrical energy and for delivering pulses of electrical energy to the ignition system responsively to trigger signals, said energy storage means including a capacitor connected across the ignition coil responsively to said trigger signals and second circuit means for connecting said capacitor to the winding means whereby said capacitor receives its stored energy from the winding means, said second circuit means including a diode connected between said winding means and said capacitor whereby said capacitor can receive its charge from said winding means and will maintain this charge after the potential at said winding means falls below the magnitude of said charge, and means responsive to the positional relationship between the rotor and stator for providing said trigger signals at selected positions as the rotor and stator are rotated relatively through said selected positions, said last named means including generating means for generating said trigger signals, said generating means comprising a coil separate from said winding means for providing said trigger signals, field means for providing a radially directed magnetic field for said coil and for the winding means, said field means comprising a plurality of circumferentially disposed radially facing permanent magnet poles for providing a circumferentially disposed field, and said generating means including means fixed to and integral with the rotor and stator and responsive to relative rotation between the rotor and stator for providing a rate of change in the magnetic field for said coil at said selected positions whereby said coil provides said trigger signals, and said generating means including further means responsive to the frequency of said trigger pulses for varying the wave shape of said trigger signals

*for automatically advancing and retarding the time of delivery of the energy in said storage means to the ignition system whereby automatic spark advance and retardation is provided, said last named means including means in addition to said coil for varying the wave shape of said trigger signal whereby the automatic spark advance and retardation is provided, connecting means connecting the generating device directly to the crankshaft whereby no slippage occurs therebetween.*

*49. In combination with an electrical generating device for generating electrical power for an engine and having a rotor and a stator and adapted to be connected to the engine crankshaft to be driven by the engine which has a spark ignition system which includes an ignition coil, with the device having winding means on the stator, the improvement comprising: energy storage means for storing electrical energy and for delivering pulses of electrical energy to the ignition system responsively to trigger signals, said energy storage means including a capacitor connected across the ignition coil responsively to said trigger signals and second circuit means for connecting said capacitor to the winding means whereby said capacitor receives its stored energy from the winding means, said second circuit means including a diode connected between said winding means and said capacitor whereby said capacitor can receive its charge from said winding means and will maintain this charge after the potential at said winding means falls below the magnitude of said charge, and trigger means responsive to the positional relationship between the rotor and stator for providing said trigger signals at selected positions as the rotor and stator are rotated relatively through said selected positions, said trigger means including generating means for generating said trigger signals, said generating means comprising a coil separate from said winding means for providing said trigger signals, field means for providing a radially directed magnetic field for said coil and for the winding means, said field means comprising a plurality of circumferentially disposed radially facing magnet poles for providing a circumferentially disposed field, said trigger means being responsive to relative rotation between the rotor and stator for providing a rate of change in the magnetic field for said coil at said selected positions whereby said coil provides said trigger signals, and said trigger means including means fixed to and integral with the rotor and stator and also including further means responsive to the frequency of said trigger pulses for varying the wave shape of said trigger signals for automatically advancing and retarding the time of delivery of the energy in said storage means to the ignition system whereby automatic spark advance and retardation is provided, said last named means including third circuit means connected to said coil and including a reactive impedance device for varying the wave shape of said trigger signals from said coil.*

*50. In combination with an electrical generating device for generating electrical power for an engine and having a rotor and a stator and adapted to be connected to the engine crankshaft to be driven by the engine which has a spark ignition system which includes an ignition coil, with the device having winding means on the stator, the improvement comprising: energy storage means for storing electrical energy and for delivering pulses of electrical energy to the ignition system responsively to trigger signals, said energy storage means including a capacitor connected across the ignition coil responsively to said trigger signals and second circuit means for connecting said capacitor to the winding means whereby said capacitor receives its stored energy from the winding means, said second circuit means including a diode connected between said winding means and said capacitor whereby said capacitor can receive its charge from said winding means and will maintain this charge after the potential at said winding means falls below the magnitude of said charge, and trigger means responsive to the positional relationship between the rotor and stator for providing said trigger signals at selected positions as the rotor and stator are rotated relatively through said selected positions, said trigger means including generating means for generating said trigger signals, said generating means comprising a coil separate from said winding means for providing said trigger signals, field means for providing a radially directed magnetic field for said coil and for the winding means, said field means comprising a plurality of circumferentially disposed radially facing magnet poles for providing a circumferentially disposed field, said trigger means being responsive to relative rotation between the rotor and stator for providing a rate of change in the magnetic field for said coil at said selected positions whereby said coil provides said trigger signals, and said trigger means including means fixed to and integral with the rotor and stator and also including further means responsive to the frequency of said trigger pulses for varying the wave shape of said trigger signals for automatically advancing and retarding the time of delivery of the energy in said storage means to the ignition system whereby automatic spark advance and retardation is provided, said last named means including third circuit means connected to said coil including a reactive impedance device for providing a varying phase shift to said trigger signals from said coil over the operating range of the engine.*

References Cited

The following references, cited by the Examiner, are of record in the patented file of this patent or the original patent.

UNITED STATES PATENTS

| | | | |
|---|---|---|---|
| 3,324,841 | 6/1967 | Kebbon et al. | 123—149 |
| 3,240,198 | 3/1966 | Loudon et al. | 123—148 E |
| 3,326,199 | 6/1967 | McMillen | 123—148 E X |
| 2,961,580 | 11/1960 | Harnden | 123—148 |
| 3,173,410 | 3/1965 | McLaughlin | 123—148 X |
| 3,186,397 | 6/1965 | Loudon | 123—148 |
| 3,292,071 | 12/1966 | McLaughlin | 320—25 |

FOREIGN PATENTS

| | | |
|---|---|---|
| 1,325,736 | 3/1963 | France. |
| 1,166,290 | 6/1958 | France. |
| 861,534 | 2/1961 | Great Britain. |

LAURENCE M. GOODRIDGE, Primary Examiner